United States Patent
Cao

(10) Patent No.: US 8,076,042 B2
(45) Date of Patent: Dec. 13, 2011

(54) CAO FUEL CELL STACK WITH LARGE SPECIFIC REACTIVE SURFACE AREA

(76) Inventor: Yiding Cao, Miami, FL (US)

( * ) Notice: Subject to any disclaimer, the term of this patent is extended or adjusted under 35 U.S.C. 154(b) by 1475 days.

(21) Appl. No.: 11/472,633

(22) Filed: Jun. 22, 2006

(65) Prior Publication Data
US 2007/0015037 A1    Jan. 18, 2007

Related U.S. Application Data

(60) Provisional application No. 60/698,635, filed on Jul. 13, 2005.

(51) Int. Cl.
*H01M 8/10* (2006.01)
(52) U.S. Cl. ......... 429/497; 429/492; 429/507; 429/517
(58) Field of Classification Search ................ None
See application file for complete search history.

(56) References Cited

U.S. PATENT DOCUMENTS

| | | | | |
|---|---|---|---|---|
| 4,490,444 A | * | 12/1984 | Isenberg | 429/31 |
| 4,876,163 A | * | 10/1989 | Reichner | 429/30 |
| 5,258,240 A | * | 11/1993 | Di Croce et al. | 429/31 |
| 6,060,188 A | * | 5/2000 | Muthuswamy et al. | 429/31 |
| 2002/0127443 A1 | * | 9/2002 | Breault | 429/13 |

* cited by examiner

*Primary Examiner* — Barbara Gilliam
*Assistant Examiner* — Maria J. Laios

(57) ABSTRACT

A polymer electrolyte membrane fuel cell stack comprising micro-fuel cell units having a circular cross section. Each includes an electric conductive tube that comprises a porous wall section and a non-permeable wall section, an inner electrode disposed around the peripheral surface of the porous wall section, a solid electrolyte member disposed around the inner electrode, and an outer electrode disposed around the electrolyte. The fuel cell stack comprises at least one fuel cell module, which includes an electric conductive planar sheet, and micro-fuel cell units laid side-by-side on the electric conductive planar sheet, the non-permeable sections of the micro fuel cell units being electrically interconnected. The fuel cell modules are stacked with an electrical insulating material between the outer electrodes of the fuel cell units in a first module and a second module's conductive planar sheet overlying or underlying the outer electrodes of the first module.

16 Claims, 7 Drawing Sheets

CAO FUEL CELL STACK WITH LARGE SPECIFIC REACTIVE SURFACE AREA

CROSS REFERENCES TO RELATED APPLICATIONS

This application is a continuation of provisional application 60/698,635 filed Jul. 13, 2005.

TECHNICAL FIELD

This invention relates to fuel cell stacks having a high power density and in particular relates to the construction of a fuel cell stack based on generally circular micro fuel cell units.

BACKGROUND OF THE INVENTION

A fuel cell is a device that directly converts the chemical energy of reactants (a fuel and an oxidant) into low-voltage d.c. electricity. Many of the operational characteristics of fuel cell systems are superior to those of conventional power generation. For a large number of fuel cell related applications, a high power density would be required. Because of the size limitation, the power density is especially critical to fuel cell applications involving portable or wireless electronics devices, such as consumer electronics, micro sensors, and micro electromechanical or micro fluidic systems. Another important application requiring a high power density is the fuel cell power system for a micro aero vehicle. In this case, the total power requirement is substantial and the size limitation is very stringent due to the small size of the vehicle. In recent years, direct liquid-feed fuel cells such as direct methanol fuel cells and direct formic acid fuel cells have been under intensive development primarily for portable applications. One of the most serious limitations related to a direct liquid-feed fuel cell is its very low power density per unit reactive surface area. Even with a heavy catalyst loading, the recent power density of a direct liquid-feed fuel cell is still on the order of 10 mW per square centimeter of reactive surface area. The power density per unit reactive surface area of a bioelectrocatalytic fuel cell is even much lower using a bio-fluid as the fuel. The power output per unit volume (power density) of a fuel cell can be expressed by the following relation:

$$P = Ap$$

where P is the power output per unit volume (power density), p is the power output per unit reactive surface area, and A is the total reactive surface area per unit volume or specific reactive surface area. From the equation above, the power density of a fuel cell system can be substantially increased by significantly increasing the total reactive surface area A even if the power output per unit reaction surface area p is quite low. This is similar to the case in human body organ systems such as the cardiovascular circulatory system and respiratory lung system, which require a rapid exchange/reaction rate within a limited volume. To fulfill the goals of these organ systems, larger vessels that carry an exchange fluid would branch out into many small vessels/capillaries to increase the exchange/reaction surface area with the surrounding cells. Since these small vessels/capillaries would have an extremely thin wall, to enhance their mechanical strength and sustain a pressure differential across the capillary walls, they generally take a circular shape, in terms of a circular tube or spherical ball. As such, two of the key mechanical characteristics of a bio system requiring a high reaction rate per unit volume are: (1) micro vessels and (2) a circular cross section.

Even for a hydrogen fuel cell power system for automotive or aerospace propulsive applications, where the size requirement is less stringent and the power density currently achievable is considered to be reasonably high, the above discussed bio-related concept is still useful. It is well known that for a hydrogen/air fuel cell using a moderate amount of catalyst, the cell voltage drops sharply as the current density is increased. This indicates that a higher current density causes a larger irreversibility in the fuel cell and significantly reduces the energy utilization rate of the fuel cell. For a fuel cell to work at a higher energy efficiency, it may need to run at a lower current density. However, this low current density would substantially reduce the power density of the fuel cell stack and render the stack to be impractical for transportation applications. With above-discussed concept, a fuel cell stack can be constructed such that it would have a significantly increased reaction surface area per unit volume and the power density of the fuel cell stack is substantially improved. The end result is that the fuel cell stack can operate at a lower current density with a much improved energy efficiency without materially increasing the size/weight of the stack.

SUMMARY OF THE INVENTION

It is an objective of the present invention to provide a fuel cell stack that has a high power output per unit volume. The fuel cell stack is based on a plurality of micro fuel cell units having a generally circular cross section. Each micro fuel cell unit comprises an electric conductive tube that includes a porous section and at least a non-permeable wall section, an inner electrode being disposed coaxially around and in intimidate contact with the peripheral surface of the porous section, a solid electrolyte member being disposed coaxially around and in intimate contact with the inner electrode, and an outer electrode being disposed coaxially around and in intimate contact with the electrolyte. The micro fuel cell units are then grouped to form a plurality of fuel cell modules. Each module comprises an electric conductive planar sheet, and a number of said micro fuel cell units being laid side by side on the electric conductive planar sheet in a generally parallel arrangement, with the non-permeable sections of the micro fuel cell units being electrically interconnected. A fuel cell stack is then constructed by stacking a plurality of modules together with an electrical insulating material being sandwiched between the outer electrodes of the fuel cell units in a first module and a second module's conductive planar sheet overlying or underlying the outer electrodes of the first module, and with the non-permeable sections of the fuel cell units in the first module being electrically connected to the conductive planar sheet of the second module, thereby the fuel cell modules in the fuel cell stack are electrically connected in series.

Another objective of the present invention is to provide means for distributing the fuel to the anodes of the fuel cell units and for distributing the oxidant to the cathodes of the fuel cell units with maximum contact surface areas between the fuel flow streams and the anodes and between the oxidant flow streams and the cathodes, so that the fuel cell reactive surface area per unit volume is substantially increased.

Yet another objective of the present invention is to provide a fabrication means for efficiently producing the micro porous tube that is a key component of the present micro fuel cell unit.

BRIEF DESCRIPTION OF THE DRAWINGS

FIG. 2a is a cross-sectional illustration in the direction A-A of FIG. 1a;

DETAILED DESCRIPTION OF THE INVENTION

Figure 1:
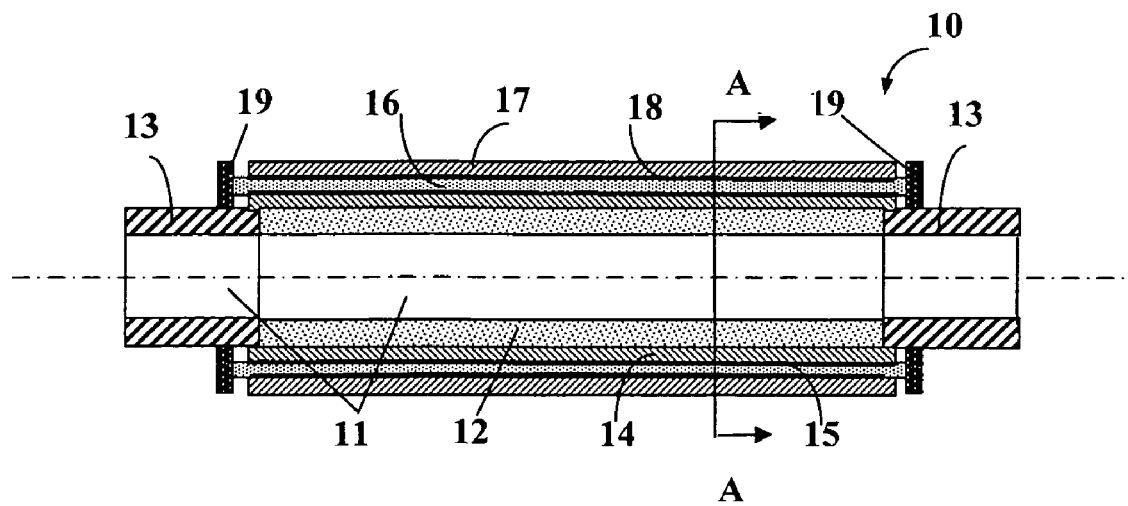
FIG. 1 is a schematic illustration of a micro fuel cell unit based on a micro porous tube.
Figure 2:
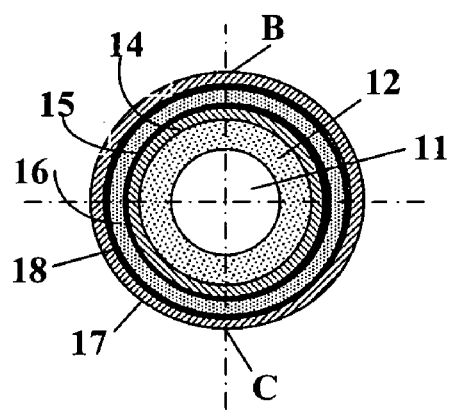
FIG. 2 is a cross-sectional illustration in the direction A-A of FIG. 1.

FIG. 1 shows schematically a micro cylindrical fuel cell unit 10 constructed based on a micro porous tube, and FIG. 2 is a cross-sectional illustration of the fuel cell unit shown in FIG. 1. The micro fuel cell unit has a generally circular cross section. In the context of this disclosure, the term "generally circular cross section" means that the cross section may be circular, elliptical, pentagonal, or hexagonal, etc., although a circular shape is preferred. The term "micro" used in this disclosure means the fuel cell unit's diameter or the "hydraulic diameter" as defined in Fluid Mechanics is on the order of 1 mm. Depending on a specific design, the actual diameter of a cylindrical fuel cell unit can be greater than 1 mm or less than 1 mm in the range of micrometers. With reference to FIG. 1, the fuel cell unit 10 has a generally circular micro tube 11, which defines an axial flow path for a fuel stream or an oxidant flow stream and comprises a porous (permeable) wall section 12, at least a non-permeable wall section 13, and a membrane electrode assembly (MEA) coaxially overlying the porous section 12. The MEA has an inner electrode (anode or cathode) 14 being coaxially around the porous section 12 and including a catalyst layer 15. A solid electrolyte 16 overlies coaxially around the inner electrode 14, and is in intimate contact with the catalyst layer 15. An outer electrode (cathode or anode) 17 is located coaxially around the electrolyte 16 with a second catalyst layer 18 being in intimate contact with the electrolyte. The MEA described above defines a reactive zone of the fuel cell unit while the non-permeable section 13 defines a non reactive zone of the fuel cell unit. To prevent the axial leakage of a reactant from the MEA to the non-reactive zone, a sealing ring 19 can be installed at each juncture between the reactive zone and the non-reactive zone of the fuel cell unit.

In addition to distributing fuel or oxidant to the fuel cell unit through the porous wall, the tube 11 can also function as a current collector for the inner electrode, transferring electrons from the porous section to the non-peaceable wall section or from the non-permeable wall section to the porous section. As such, the micro tube must be highly electric conductive and can be made of metallic materials having a high electrical conductivity. Alternatively, the tube can be made of a non-metallic material and is coated with a highly conductive material over the matrix of the porous material. Additionally, the inner catalyst layer 15 can be directly deposited on the outer surface of the porous section 12, and the thickness of layer 14 can be reduced to zero.

Similar to the properties of the electrodes in prior arts, the outer electrode 17 is porous, conductive, and generally thin. It may be formed by depositing coaxially a thin layer of porous, conductive layer outside of the electrolyte through a thick film fabrication technique, by winding a conductive filament coaxially around the electrolyte, or by wrapping a flexible conductive cloth around the electrolyte. Because of the nature of a thin electrode, the transportation of electrons in the outer electrode between the reactive zone and the non-reactive zone of the fuel cell unit would be difficult due to a long travel distance required. However, because of the small diameter of the micro fuel cell unit, the transportation of electrons in the outer electrode around the circumference is relatively easy due to the small travel distance required. As shown in FIG. 2, electrons can move from point B to point C or from point C to point B within the outer electrode without incurring a large voltage drop. This unique feature of a micro fuel cell unit provides the foundation for constructing a fuel cell module.

Figure 1A:
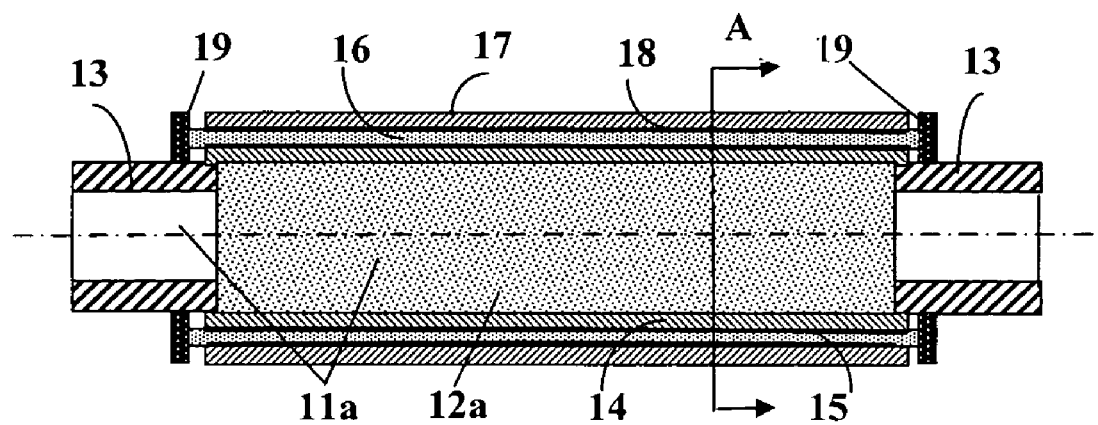
FIG. 1a is a schematic illustration of a micro fuel cell unit based on a micro porous tube in the form of a porous cylinder.
Figure 2A:
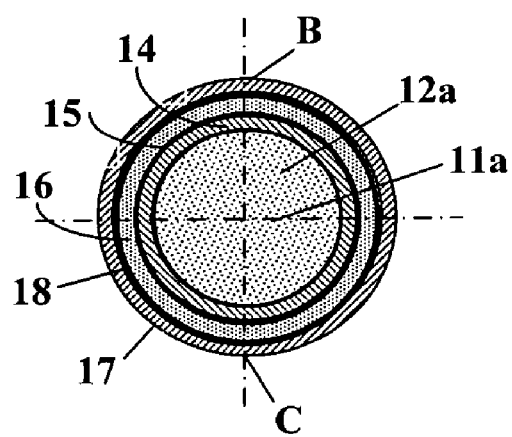

The porous wall section 12 in FIGS. 1 and 2 may be replaced by a porous cylinder as shown in FIG. 1a and FIG. 2a. The non-permeable wall section 13 could also be in the form of an extension of the porous cylinder 12a with a non-permeable peripheral surface (not shown). Flow resistance in the porous flow passage co-defined by the porous cylinder section 12a and non-permeable wall section 13 could be higher compared to that associated with the flow passage co-defined by porous section 12 and non-permeable wall section 13 as shown in FIG. 1. However, the cost of fabricating a micro porous cylinder section could be lower compared to that of fabricating a porous wall section.

Figure 3:
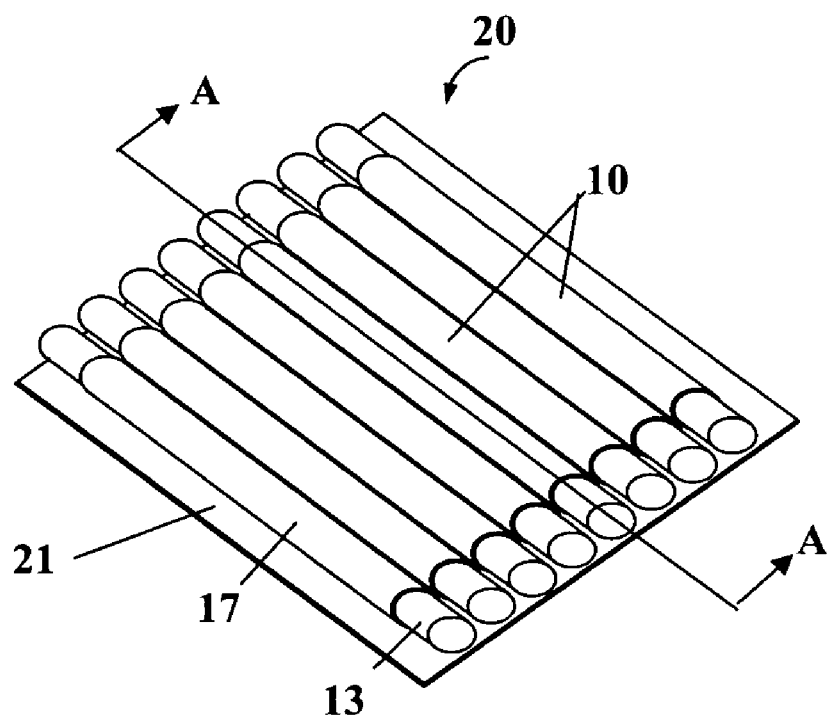
FIG. 3 is a schematic perspective illustration of a fuel cell module comprising a group of micro fuel cell units conductively bonded onto a conductive planar sheet.
Figure 4:
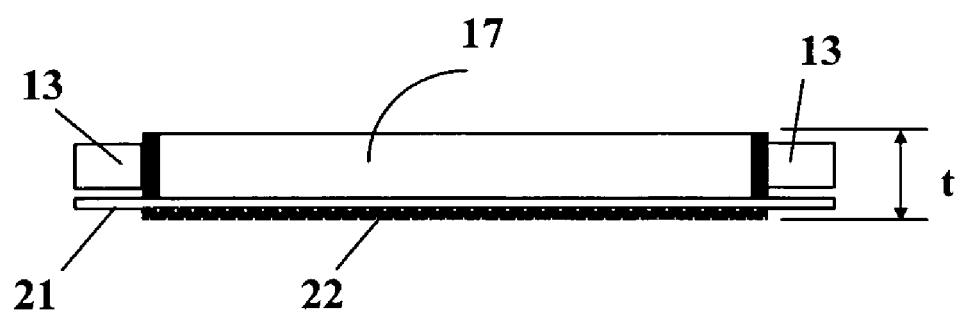
FIG. 4 is a sectioned view in the direction A-A of FIG. 3, showing an insulation layer on the bottom surface of the planar sheet.

Turning now to FIG. 3, there is provided a schematic perspective illustration of a fuel cell module 20 comprising a group of micro fuel cell units 10 conductively bonded onto a conductive planar sheet 21. FIG. 4 is a sectional view of the fuel cell module 20 in the direction A-A of FIG. 3, showing an insulation layer 22 on the bottom surface of the planar sheet 21. The insulation layer 22 is generally coextensive with the reactive zone of the fuel cell units. The insulation layer 22 can be directly coated onto the bottom surface of the planar sheet. However, it can also be in the form of a separate insulating material sheet. The insulation layer 22 is to be used for the construction of a fuel cell stack as will be described later. The micro fuel cell units are laid side by side on the planar sheet in a generally parallel arrangement. It should be emphasized that the bonding between the outer electrodes of the micro fuel cell units 10 and the conductive planar sheet 21 would preferably occur at the contacting lines between the individual fuel cell units and the conductive sheet, leaving most of the external surfaces of the outer electrodes in contact with the reactant. The non-permeable sections (the non-reactive zones) 13 of the units 10 should be electrically isolated from the conductive planar sheet 21. The non-reactive zones 13 are generally co-extensive with the conductive sheet 21 in the longitudinal extent, and can be electrically interconnected.

With such construction, the conductive planar sheet 21 would serve as a current collector for all outer electrodes of the fuel cell units 10, and the fuel cell units in the same module are electrically connected in parallel.

Figure 5:
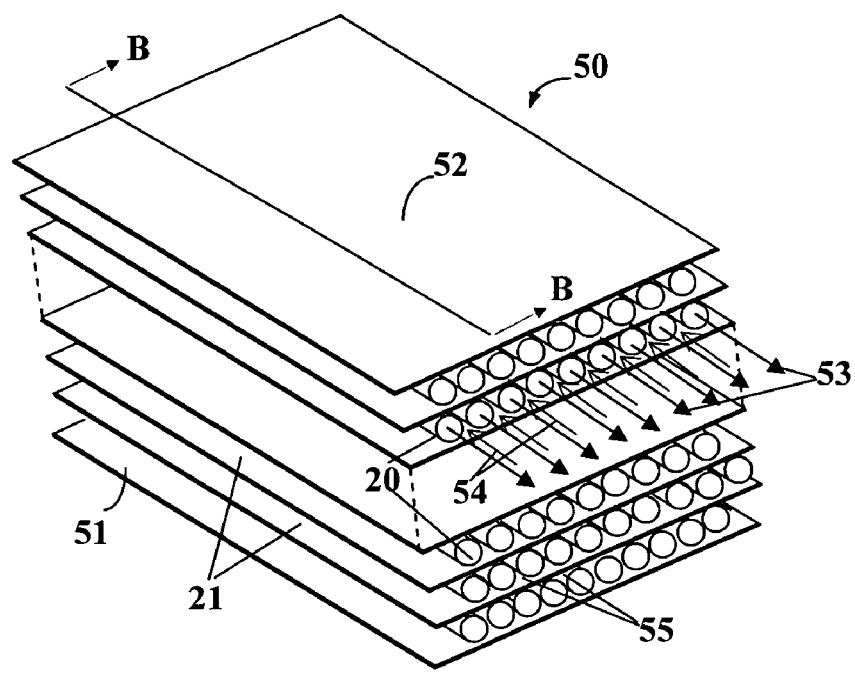
FIG. 5 is a schematic perspective illustration of a fuel cell stack integrating a plurality of fuel cell modules.
Figure 6:
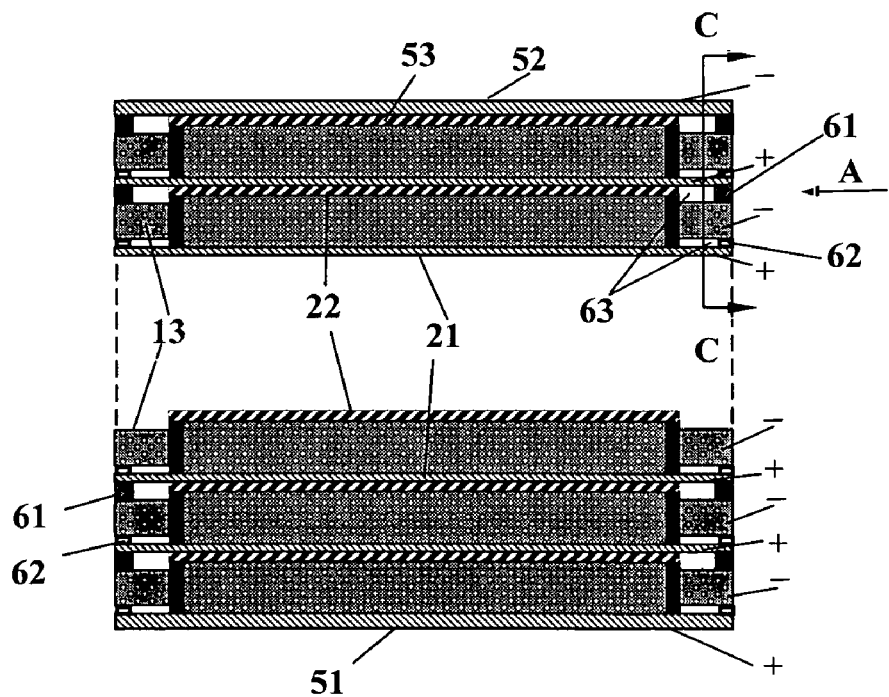
FIG. 6 is a sectioned illustration in the direction B-B of FIG. 5, showing a serial connection of the modules as well as the arrangement of the two end plates.

Next, a fuel cell stack 50 is constructed by stacking the afore-described fuel cell modules 20 with one on top of another in the vertical direction as shown in FIG. 5. Associated with FIG. 5, FIG. 6 is a schematic sectioned view in the direction B-B of FIG. 5. As shown in FIG. 6, the planar sheet 51 of the bottommost module is made thicker to serve as a current collector of the stack. The other stack current collector is provided by overlying a relatively thicker conductive planar sheet 52 on top of the topmost module with an insulation layer 53 sandwiched between the bottom surface of the stack current collector 52 and the outer electrodes of the topmost module. As described earlier, the micro fuel cell units in a fuel cell module are electrically connected in parallel; the voltage output of a single fuel cell module would be normally below 1 V. To construct a fuel cell stack with a practically acceptable voltage, these fuel cell modules must be electrically connected in series. This is accomplished by electrically bonding the edge of the non-reactive zone of a given module with the edge of the planar conductive sheet of the module immediately overlying the given module through a conductive bonding material 61, as shown in FIG. 6. For convenience it is assumed in the following discussion that the fuel flows through the bore of the porous tube and is distributed to the inner electrodes of the micro cell units through the porous wall and the oxidant is distributed to the outer electrodes of the fuel cell units in connection with a proton exchange membrane (PEM) fuel cell. With this flow arrangement, the anode of a first fuel cell module is electrically connected to the cathode of a second module immediately overlying the first module, and the cathode of the first module is electrically connected to the anode of a third module immediately underlying the first module. Electrical energy is extracted from the stack through the stack current collectors 52 and 51 with a sufficiently high voltage.

Once a fuel cell stack is constructed, the fuel and oxidant ($O_2$ or air) must be properly introduced to the anodes and cathodes of the fuel cell units, respectively. Returning now to FIG. 5, there is also shown schematically the flow streams of fuel and oxidant in the reactive zones of the fuel cell units. In the present case, the fuel streams 53 flow in the bores of the fuel cell units for providing the fuel to the anodes of the fuel cell units; the oxidant streams 54 flow on the shell sides of the fuel cell units along the longitudinal spaces 55 formed between the adjacent external cathode surfaces and the planar sheets immediately overlying and underlying the cathode surfaces, respectively, to supply the oxidant to the cathodes of the fuel cell units. Like a traditional fuel cell stack design in prior arts, a counter flow arrangement between the fuel streams on the bore side and the oxidant flow streams on the shell side are employed in the present embodiment. Additionally, a conductive porous material, which is conductively connected to the adjacent fuel cell units' outer electrodes and the conductive planar sheet in the same module, can be filled in the space 55 (not shown). While allowing a fuel or an oxidant to flow through, the filled porous material in space 55 would enhance the electron transport capacity from the planar sheet to the outer electrodes or from the outer electrodes to the planar sheet when the diameter of the fuel cell unit is relatively large.

The flow stream alignment as shown in FIG. 5 is generally associated with the flow streams in the reactive zones of the fuel cell units. However, before the flow streams reach the reactive zone, they must be properly introduced from the external source into the fuel cell stack. In the following, this issue will be addressed as a preferred embodiment of the present invention. For the purpose of introducing fuel/oxidant into the fuel cell stack, the conductive bonding 61 and non-conductive sealing 62, as shown in FIG. 6, are preferably located toward the edges of the non-reactive zones, leaving the spaces 63 for the introduction or discharge of the oxidant into or out of the fuel cell stack from a direction generally perpendicular to the longitudinal direction of the fuel cell units. The spaces 63 are generally formed between the non-reactive zones and the conductive sheet in the same module and between the non-conductive zones and the conductive sheet of the next module overlying the outer electrodes. The space between the edges of the non-reactive zones of a fuel cell module and the edge of the planar sheet in the same module may also be sealed using a non electric conductive material 62. In the present embodiment of the invention, the conductive bonding 61 and non conducive sealing 62 would also facilitate the fuel introduction into or discharge out of the bores of the fuel cell units from the frontal or rear surface of the stack.

Figure 7:
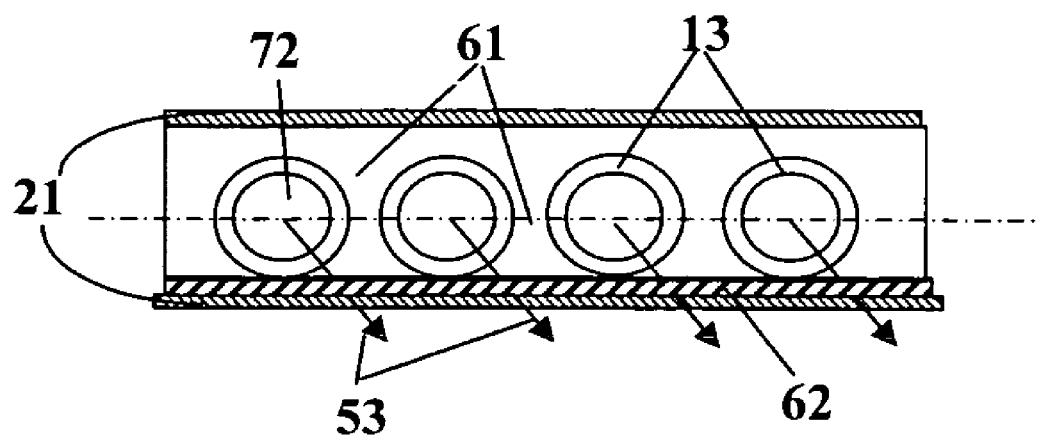
FIG. 7 is an enlarged fragmentary view of a portion of the fuel cell stack viewed from direction A of FIG. 6.
Figure 8:
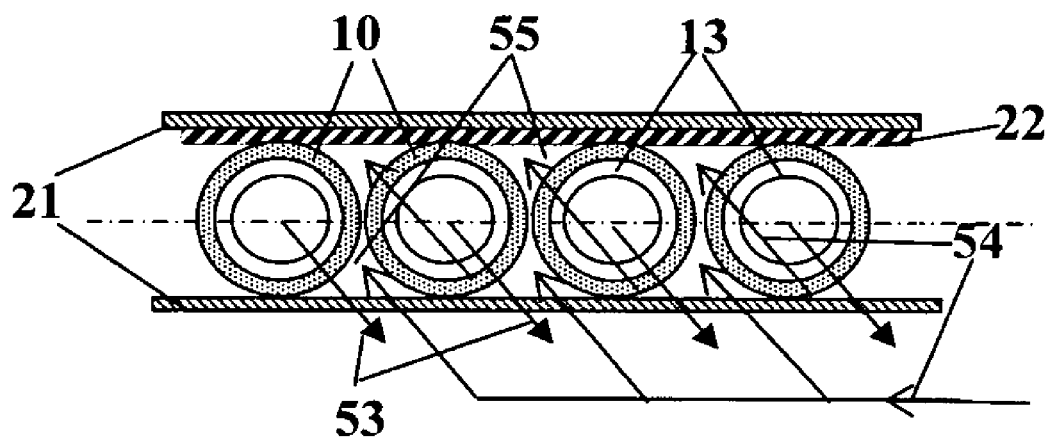
FIG. 8 is an enlarged fragmentary sectional view in the direction C-C of FIG. 6.

FIG. 7 is an enlarged fragmentary view of a portion of the fuel cell stack viewed from direction A of FIG. 6, showing a fuel flow stream 53 being discharged from the fuel cell stack through the inner flow passages 72 (bore side) of the fuel cell units. While flowing in the inner flow passages of the fuel cell units, the fuel is supplied through the porous walls of the reactive zone to the anodes of the fuel cell units (not shown). FIG. 8 is a sectional view of the fuel cell stack in the direction C-C of FIG. 6. As shown in FIG. 8, the oxidant flow streams 54 are introduced into the fuel cell stack in a generally perpendicular direction to the axial direction of the fuel cell unit through spaces 63 of FIG. 6, and subsequently flow in the longitudinal spaces 55 formed between the adjacent external cathode surfaces and the planar sheets immediately overlying and underlying the cathodes, respectively, to supply the oxidant to the cathodes of the fuel cell units.

Apparently, both flow streams on the bore and shell sides of the fuel cell units as shown in FIG. 5 are single pass using a terminology commonly used in a heat exchanger community. However, when an increase in the flow stream velocity is desired, a multi-pass arrangement can be created for the fuel flow streams using U-bend tubes (not shown), and a multi-pass arrangement for the oxidant flow stream can be created using baffles (not shown). The U-bend tubes may be preferably installed at the frontal and rear surface of the fuel cell stack with respect to the axial direction of the cylindrical fuel cell units, and the baffles may be preferably installed within the spaces 63 shown in FIG. 6.

It should be noted that the flow stream arrangements and the edge bonding for serial connection of the fuel cell modules illustrated above are just few preferred embodiments in accordance with the present invention. In general, the flow stream arrangements and serial connection could vary in accordance with specific design conditions. For instance, a flow stream on the shell side of the fuel cell units, oxidant or fuel, could be introduced into the fuel cell stack from the top or bottom of the stack and flows in a direction substantially perpendicular to the planes defined by the conductive planar sheets as oppose to the flow direction substantially parallel to the planar sheets as illustrated earlier in FIG. 5 and FIG. 8. In this case, however, both conductive sheets and insulation layers should be perforated and sufficient spaces should be maintained between adjacent fuel cell units on the same sheet to provide enough cross-flow passages for the shell-side flow stream (not shown).

Figure 9:
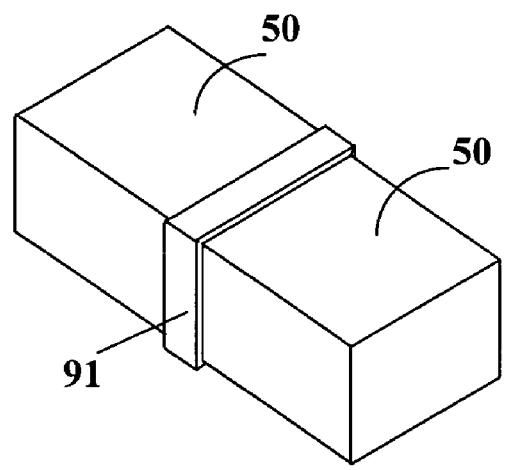
FIG. 9 shows schematically the longitudinal connection of two fuel cell stacks of FIG. 5 with a transition zone.

As discussed earlier, the fuel cell units used to construct a fuel cell stack are based on micro tubes having a substantially large portion of porous section (porous wall or porous cylinder). In general, the wall thickness of the porous tube may be on the order of 0.1-0.2 mm. This wall thickness may be further reduced as the diameter of the fuel cell unit is reduced. A porous tube with such a thin wall may have a limited length when a certain method is used to fabricate it. Additionally, the micro tube wall or porous cylinder will serve as the current collector for the inner electrode of the fuel cell unit. With such a thin wall or small porous cylinder diameter, the tube may be limited to a certain length due to a limited current collection capacity. To overcome the afore-discussed limitation and construct a larger fuel cell stack, a plurality of the fuel cell stacks 50 as shown in FIG. 5 may be connected with a transition zone 91 for each connection to form a longer fuel cell stack, as shown in FIG. 9. The function of the transition zone 91 is to pass the fuel streams (for instance) flowing in the bores of a first stack 50 to the bores of a second stack 50, and to pass the oxidant flow streams flowing on the shell sides of the first stack 50 to the shell sides of the second stack 50.

Figure 10:
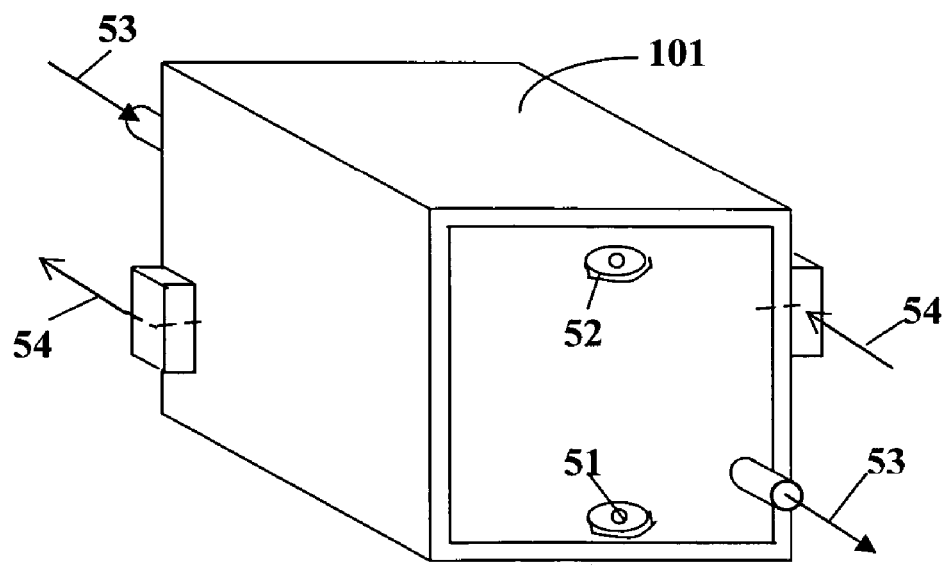
FIG. 10 shows schematically the external look of a fuel cell stacked housed in a chassis in accordance with the present invention.

Finally, the fuel cell stack constructed can be housed in a chassis 101 as shown in FIG. 10. The fuel cell modules stacked in the chassis may be clamped using a top plate in conjunction with screws (not shown). The clamping force needed in the present invention, however, is much more moderate, compared to the clamping force required for a conventional fuel cell stack using bio-polar plates. In the present invention, each fuel cell module assembled in a fuel cell stack already integrates a current collector for each electrode, which results in a stand-alone feature.

Figure 11:
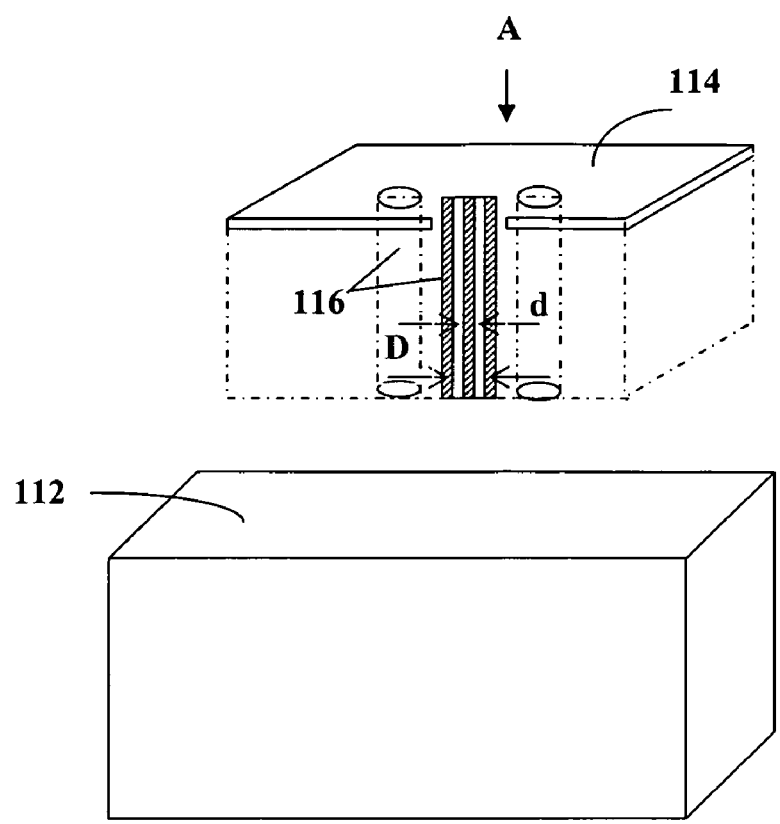
FIG. 11 is a schematic perspective illustration of the electrode of an EDM as well as the porous work piece in connection with the fabrication of the micro porous tube.

For the successful construction of a fuel cell stack according to the present invention, the method of fabricating the micro porous tube used in the fuel cell unit must be addressed. Although several methods may be employed for this purpose in accordance with the prior arts, one of the most economical ways is metallic particle sintering through a mold. Particle sintering is a matured technique that has been used to produce porous media for decades. Considering the condition of a thin wall or a small cylinder diameter for the present application, a unique method that combines the conventional particle sintering technique with an electrical discharge machining (EDM) method is disclosed. Referring to FIG. 11, a block of porous material 112 is first formed through a conventional sintering process. Then this block of porous material is used as a work piece in an electrical discharge machining (EDM) process. The electrode 114 of the EDM is made of a plurality of cylindrical molds 116. Each mold has a center core of diameter d and an outer wall of inner diameter D. The core diameter d should be approximately equal to or slightly less than the bore of the micro porous tube to be made, and the inner diameter D should be approximately equal to or slightly larger than the outer diameter of the micro porous tube. As the electrode moves down in the direction A of FIG. 11 and cut through the work piece 112 via a SERVO motion, a plurality of porous tubes are produced. In addition to aforementioned fabrication process through a mold based EDM process, a wire based EDM can be employed for the production of the micro porous tube (not shown). Alternatively, the bores of the micro porous tubes can be preformed in the work piece through the sintering process, and then an EDM process is employed. The EDM described herein can also be used to produce micro porous cylinders from the porous work piece. In this case, the inner core diameter d of mold 116 is zero.

Figure 12:
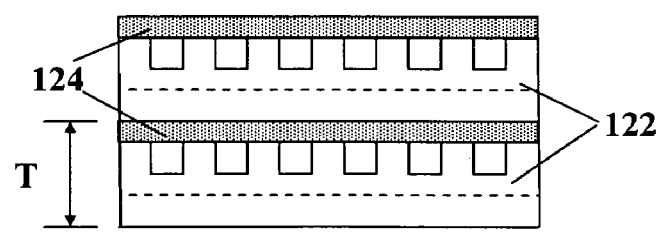
FIG. 12 is a sectional view of a planar fuel cell stack employing bipolar plates from prior arts.

Having described the construction of a fuel cell stack according to the present invention, the issue of increasing the reactive surface area is discussed. This discussion is based on the comparison between the present fuel cell stack and a standard planar fuel cell stack employing bipolar plates. Considering a standard planar fuel cell stack of prior arts (FIG. 12) having an effective membrane electrode assembly (MEA) area of W (width)×L (length). The unit thickness associated with a MEA is the thickness of a bipolar plate 122 plus the thickness of the MEA 124, and is denoted by T. The unit reactive surface area corresponding to the unit stack volume (W×L×T) is W×L. Turning now to the fuel cell stack according to the present invention. Assuming that the fuel cell module as shown in FIG. 3 has the same width (W) and Length (L). The thickness of the fuel cell module is equal to the outer diameter of the micro fuel cell unit plus the thicknesses of the conductive sheet and the insulating material, and is denoted by t, as illustrated in FIG. 4. The ideal reactive surface area associated with the module is π×W×L. Therefore, the total reactive surface area for the same volume as that of the conventional fuel cell stack (W×L×T) is (π×W×L)×(T/t). Accordingly, the ratio of reactive surface area of the present fuel cell stack to the conventional fuel cell stack is:

$$\frac{\pi WL(T/t)}{WL} = \frac{\pi T}{t}$$

For a standard planar fuel cell stack employing bipolar plates, the unit thickness (a bipolar plate plus a MEA) is around 5 mm (T=5 mm). Consider the present fuel cell stack having an effective fuel cell unit diameter of 1.2 mm and the thickness of conductive sheet/insulating materials of 0.2 mm. The total thickness of a fuel cell module is around t=1.4 mm. Therefore, $$\frac{\pi T}{t} = \frac{3.14 \times 5mm}{1.4mm} = 11.2$$

The above result indicates that the fuel cell stack according to the present invention could potentially increase the reactive surface area by more than 10 times. It should be pointed out that the present calculation is based on the ideal condition without taking into account the contact surface area between the fuel cell unit and the conductive sheet. Even if this contact surface area is taken into account in the calculation, the increase of the reactive surface area could still be above 10 folds with a smaller fuel cell unit diameter. This substantial increase in the reactive surface area per unit volume is especially important to direct liquid feed fuel cells such as direct methanol fuel cells, direct formic acid fuel cells, and bioelectrocatalytic fuel cells using a bio fluid as the fuel due to their very low power density per unit reactive surface area.

It will thus be seen that the invention effectively attains the objectives set forth above. It is intended that all matter contained in the above specification or shown in the accompanying drawings be interpreted as illustrative and not in a limiting sense. Any changes, modifications, and variations of the subject invention will be apparent to those skilled in the art after considering this specification together with the accompanying drawings.

What is claimed is:

1. A polymer electrolyte membrane (PEM) fuel cell stack having a plurality of micro fuel cell units, wherein each micro fuel cell unit comprises a micro electric conductive tube defining an inner axial flow path for the fuel cell unit, said tube including a porous section, an inner electrode being disposed coaxially around and in intimidate contact with a peripheral surface of the porous section, a solid polymer electrolyte member being disposed coaxially around and in intimate contact with the inner electrode, and an outer electrode being disposed coaxially around and in intimate contact with the electrolyte, said inner electrode, polymer electrolyte and outer electrode defining a reactive zone and generally covering the peripheral surface of the porous section of the micro tube, said fuel cell stack comprising a plurality of fuel cell modules, wherein each fuel cell module comprises an electric conductive planar sheet, and the plurality of micro fuel cell units being laid side by side on the electric conductive planar sheet in a generally parallel arrangement, with the inner electrodes of said micro fuel cell units being electrically interconnected and being electrically isolated from the conductive planar sheet, wherein said fuel cell modules being are stacked one over another with an electrical insulating material being sandwiched between the outer electrodes of the micro fuel cell units of a first fuel cell module and the conductive planar sheet of a second fuel cell module overlying the outer electrodes of the first module, and wherein the stacked fuel cell modules are electrically connected in series.

2. The fuel cell stack according to claim 1, wherein a fuel is distributed to the inner electrodes of said micro fuel cell units through fuel streams flowing in the inner axial flow paths of said micro fuel cell units, and an oxidant is distributed to the outer electrodes of said micro fuel cell units through oxidant streams flowing on a shell sides of the fuel cell units along spaces defined by the external surfaces of the outer electrodes and the planar sheet respectively overlying and underlying the outer electrodes.

3. The fuel cell stack according to claim 1, wherein an oxidant is distributed to the inner electrodes of said micro fuel cell units through oxidant streams flowing in the inner axial flow paths of said micro fuel cell units, and a fuel is distributed to the outer electrodes of said fuel cell units through fuel streams flowing on a shell side of the micro fuel cell units along the spaces defined by the external surfaces of the outer electrodes and the planar sheet surfaces respectively overlying and underlying the outer electrodes.

4. The fuel cell stack according to claim 1, wherein the cross section of said micro fuel cell units being generally circular.

5. The fuel cell stack according to claim 1, wherein the micro fuel cell units in said fuel cell module being electrically bonded onto the conductive sheet at contacting lines between the fuel cell units and the conductive sheet.

6. The fuel cell stack according to claim 1, wherein the flow streams in the inner axial flow paths of the micro fuel cell units have a multi-pass arrangement.

7. The fuel cell stack according to claim 1, wherein the flow streams on a shell side of the micro fuel cell units have a multi-pass arrangement.

8. The fuel cell unit as defined in claim 1, further comprising a sealing ring at the edge of the reactive zone of the fuel cell unit.

9. The fuel cell module as defined in claim 1, wherein the electrical insulating material is directly coated onto the conductive sheet surface opposite to the sheet surface in contact with the fuel cell units.

10. The fuel cell stack as defined in claim 1, wherein the micro tube further comprises a non-permeable wall section generally having a smaller diameter than the outer diameter of said outer electrode, said non-permeable wall section co-defining an inner axial flow passage with said porous section and being electrically communicable with the inner electrode of the fuel cell unit, wherein said non-permeable wall sections of the fuel cell units in a fuel cell module being electrically interconnected through a conductive material between adjacent non-permeable wall sections, and electrically insulated from the planar sheet in the same module through an insulation material between the non-permeable sections and the planar sheet, and wherein the edges of the non-permeable wall sections in a first module being electrically connected to a second module's conductive planar sheet overlying the outer electrodes of the first module, thereby the fuel cell modules in the fuel cell stack being electrically connected in series.

11. The fuel cell stack as defined in claim 10, wherein a fuel is introduced into the fuel cell stack through a bore in said non-permeable wall section, and an oxidant is introduced into the stack through the shell sides of the non-permeable wall sections in a direction generally perpendicular to an axis of the fuel cell unit.

12. The fuel cell stack as defined in claim 10, wherein the oxidant is introduced into the fuel cell stack through a bore in said non-permeable wall sections section, and a fuel is introduced into the stack through the shell sides of the non-permeable wall sections in a direction generally perpendicular to an axis of the fuel cell unit.

13. The micro tube as defined in claim 1, wherein the porous section being fabricated through a particle sintering technology in conjunction with a mold based electrical discharge machining process.

14. The micro tube as defined in claim 1, wherein the porous section being fabricated through a particle sintering technology in conjunction with a wire based electrical discharge machining process.

15. The fuel cell unit as defined in claim 1, wherein the micro fuel cell unit is a bioelectrocatalytic fuel cell with a bio fluid as the fuel.

16. The fuel cell stack according to claim 1, wherein the micro tube is in the form of a micro porous cylinder.

* * * * *